July 8, 1958 H. HEUER 2,842,048
ELECTRIC CONTROL ARRANGEMENT
Filed July 9, 1957 5 Sheets-Sheet 1
Fig. 1
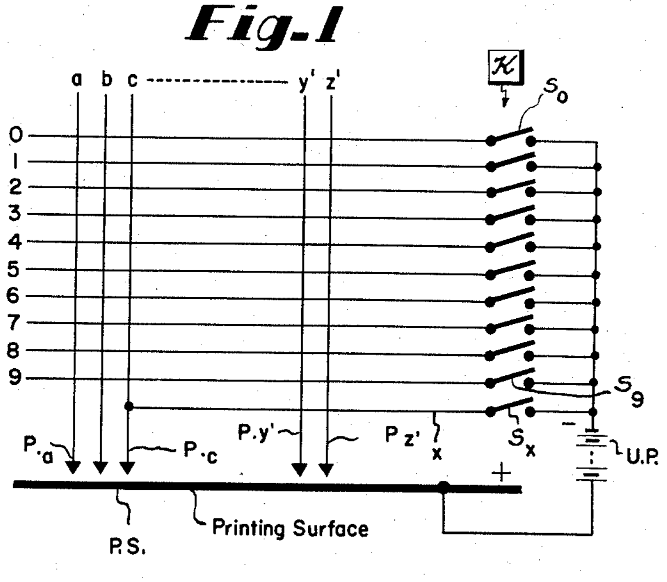
Fig. 2
| | | | |
|---|---|---|---|
| a | b | c | d |
| e | f | g | h |
| i | j | k | l |
| m | n | o | p |
| q | r | s | t |
| u | v | w | x |
| y | z | y' | z' |
Fig. 3
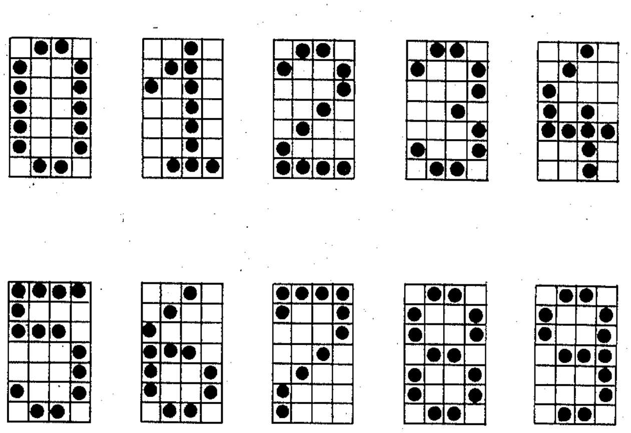
INVENTOR
HANS HEUER
BY Toulmin & Toulmin
ATTORNEYS July 8, 1958 H. HEUER 2,842,048

ELECTRIC CONTROL ARRANGEMENT

Filed July 9, 1957 5 Sheets-Sheet 2

INVENTOR

HANS HEUER

BY Toulmin & Toulmin

ATTORNEYS

July 8, 1958 H. HEUER 2,842,048

ELECTRIC CONTROL ARRANGEMENT

Filed July 9, 1957 5 Sheets-Sheet 3

INVENTOR

HANS HEUER

BY Taulmin & Taulmin

ATTORNEYS

INVENTOR
HANS HEUER
BY Toulmin & Toulmin
ATTORNEYS

INVENTOR
HANS HEUER
BY Toulmin & Toulmin
ATTORNEYS

United States Patent Office 2,842,048

Patented July 8, 1958

2,842,048

ELECTRIC CONTROL ARRANGEMENT

Hans Heuer, Wilhelmshaven, Germany, assignor to Olympia Werke A. G., Wilhelmshaven, Germany Application July 9, 1957, Serial No. 670,736

Claims priority, application Germany July 23, 1956

14 Claims. (Cl. 101—93)

This invention relates to an electric control arrangement for printing apparatus and the like.

In the printing apparatus to be controlled by the electric control arrangement according to this invention, the printed characters are produced by composition of several character elements, in random combination, each of which elements is printed by an electrically selectable printing unit. All the printing units are, of necessity, in a close arrangement, preferably in a stencil of rectangular, circular or other suitable shape, so that a desired letter, figure or other symbol can be formed, at will, by composing a suitable selection of a number of the elements.

Control devices for this purpose are known in the art, in which character signals are received at the input side of an electrical network and are loaded into the input or loading lines thereof, whose number corresponds to that of the characters to be printed, and transmitted from there via diode means into output or working lines which terminate each in one of the aforesaid printing units. The diode means are provided at each intersection between an input line and an output line to prevent influencing other than the desired output lines from a given input line.

After an input line has been selected, a random distribution of the working current from the input line can then be made by an automatic selection and combination at will over various output lines connected to corresponding printing units. The latter are, for instance, electromagnetically operable.

In the conventional network, a certain input line corresponding to a given character to be printed, is connected to every one of the output lines leading to the printing units, from whose character elements the character in question is made up, by means of a diode such as a thermionic diode or a crystal diode as those including germanium or silicon.

The conventional networks, therefore, require a great number of these diode connections. If, for instance, a printing apparatus having a parallel arrangement of 20 numeral character decades 0 to 9, and a subdivision of the stencil field into 28 units, is to be used for printing numbers composed of up to twenty numerals adjacent each other, the total number of conventionally required diodes would amount to $123\times20=2460$ diodes exclusively for the control of the printing apparatus.

It is an object of my invention to provide a control arrangement for printing apparatus of the kind described in which the number of diodes required in the electrical control network is greatly reduced, for instance, by up to 40% and more.

This object is attained by a control arrangement according to my invention in which a considerable portion of the diodes conventionally connecting the input and output lines of a suitable electrical control network is replaced by transverse connecting lines intermediate various output lines, whose subsequently connected printing units become thus operable from one and the same input line via a single diode.

According to another important feature of my invention, those transverse connecting lines which are to be operable from either of the two output lines which they transversely connect, contain diode means which permit influencing both transversely connected output lines from one of two input lines, while only one of the working lines can be influenced separately from the other input line in a manner to be explained in more detail hereinafter.

According to yet another feature of my invention, certain diode means conventionally connecting input and output lines in the above-mentioned electrical control network are replaced by direct connections between these lines without using diodes.

In a printing apparatus which comprises a printing or writing surface on which characters are printed, e. g. by producing visible changes in the printing surface, for instance, by burning a mark in a paper surface through the passage of electric current from a printing unit to the surface, current can thus be caused to flow from a source of unidirectional potential through an input line, an output line diode-connected to the input line, and via a transverse connecting line to another output line. The printing units at the end of both output lines will then simultaneously burn a mark forming an element of the character to be printed, into the printing surface.

Wherever an individual input line serves only one output line, it may be directly connected thereto without the use of diodes.

It is finally a feature of the electric control arrangement, according to my invention, that output lines serving for printing different characters containing in repetition the same printing elements or groups of printing elements, can be connected to the input lines respectively pertaining to these different characters, via one and the same set of diodes.

My invention will be still better understood from the subsequent description thereof in connection with the accompanying drawings in which:

Fig. 1 illustrates schematically a general printing apparatus control arrangement;

Fig. 2 shows, by way of example, a stencil of 28 printing elements *a–z′* from which the characters to be printed, are composed by suitable selection of the necessary elements;

Fig. 3 illustrates which of the elements shown in Fig. 2 can be selected to print the numerals 0 to 9;

Figure 4:
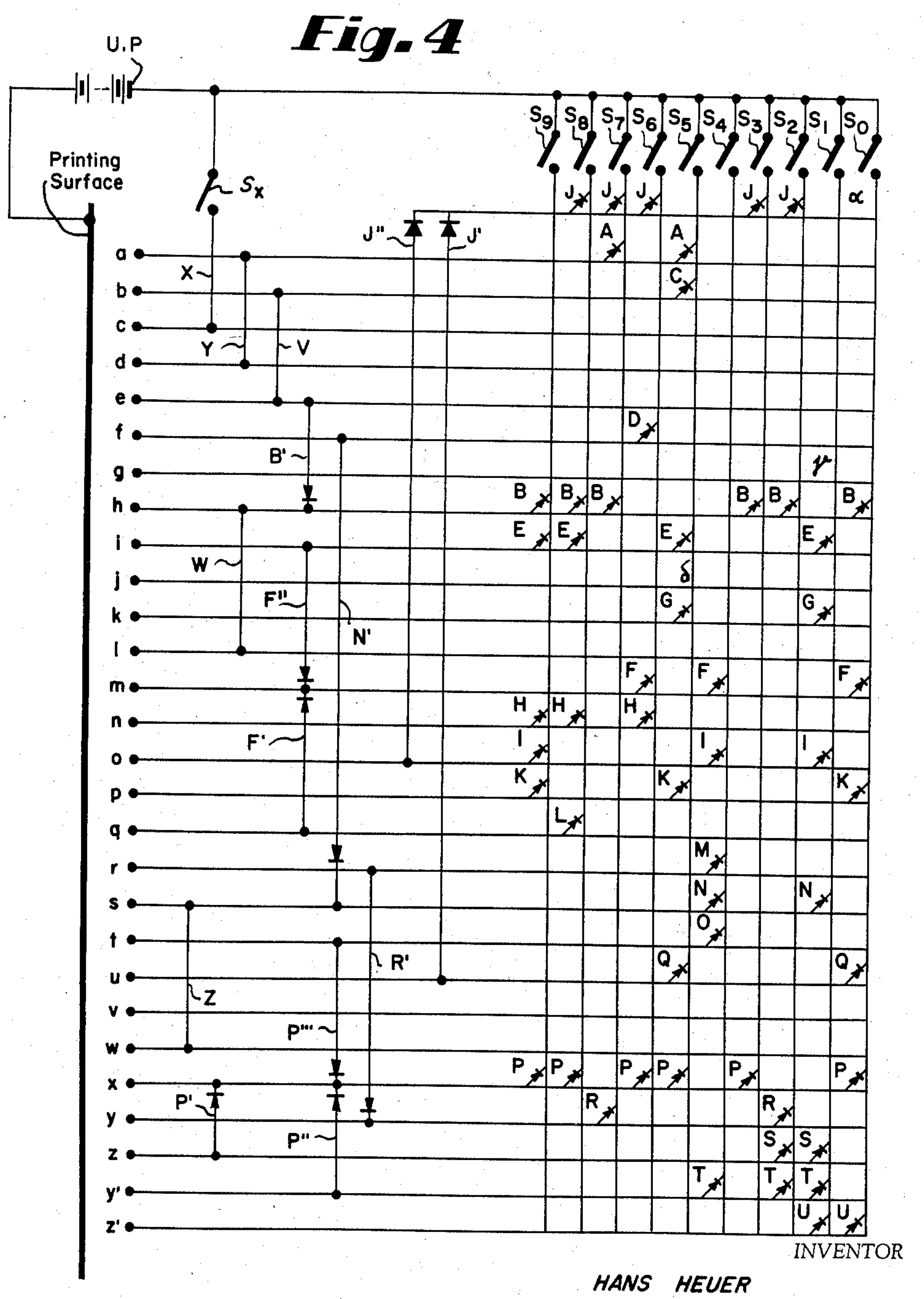
Fig. 4 is a schematic view of an embodiment of the electric control arrangement according to the invention, adapted for use with a printing stencil as illustrated in Fig. 2.

Referring now to the drawings more in detail, the general control arrangement illustrated in Fig. 1 comprises a plurality of input lines 0, 1, 2 . . . to 9, corresponding to the number of characters to be printed. These input or loading lines are connected, each via a single throw switch $S_0$ to $S_9$, to the negative terminal of an electric current source of unidirectional potential (direct current battery) U. P. diode means connecting the input lines to work or output lines *a*, *b*, *c* . . . through *y′*, *z′* have been omitted. In conventional networks such diodes must be provided at the intersection between each input line and all those output lines which have to be operated to compose the character of the respective input line.

Output lines *a* to *z′* lead to conventional printing or writing units comprising, for instance, contact heads schematically represented at $P_a$ to $P_{z'}$, which contact heads are in constant contact with the printing surface P. S. which is connected, for instance, to the positive terminal of current source U. P. Whenever one of switches $S_0$ to $S_9$ is closed, current flows through that input line and from there via all available diode passageways into the diode connected output lines and from there through the contact head and the printing surface. At the point of contact between the contact head and the printing surface the current passing from one to the other causes a visible change in the printing surface by some chemical change thereof, for instance, by burning a mark in the surface.

A keyboard $\mathscr{K}$ or the like preferably automatically controlled device actuates switches $S_0$ to $S_9$ selectively and successively in the order of the text to be printed.

The drawings and the description thereof are based on the use of conventional thermionic vacuum tubes and crystal diodes. All conventional accessory circuits required have been omitted from the drawings for the sake of clarity. For the same reason there have been omitted all details of the direct current power supply.

Furthermore, auxiliary work lines $\alpha,\beta$ may be provided in the arrangement, if it represents a network according to the invention, which auxiliary work lines do not lead to printing units, and whose purpose shall be presently explained. Also, the purpose of input line X and switch $S_x$ will be explained in connection with the next following figures.

Fig. 2 illustrates a four-by-seven stencil which is subdivided into 28 elements *a* through *z'*. As can easily be seen from Fig. 3, if this stencil is to be used for printing the numeral characters 0 to 9, all elements except element *v* are used at one time or the other. Each of these elements must thus be printable by a printing unit comprising a contact head and a work or output line, except element *v*.

On the other hand it will be noted that the printing unit corresponding to element *c* must be actuated at all times when a numeral is to be printed. Consequently, it is possible in the networg, according to the invention, based on this stencil, to save up to ten diodes by connecting the output line *c* directly to the negative terminal of source U. P. via bypass line X and switch $S_x$. Whenever keyboard $\mathscr{K}$ actuates one of switches $S_0$ to $S_9$, conventional means cause switch $S_x$ to be actuated simultaneously therewith.

It will be noted that in a conventional network the number of diodes required for connecting each input line with the respective output lines required for printing all elements of which the character of the input line is composed, would amount to 123 as can easily be determined.

In the control network, according to the invention, based on the stencil shown in Fig. 2, which network is schematically illustrated in Fig. 4, the number of diodes required has been reduced to only 65.

This network corresponds to the general network shown in Fig. 1 in that it comprises input lines 0 to 9 and output lines *a* to *u* and *w* to *z* as well as *y'* and *z'*. It also comprises auxiliary work line $\alpha$.

Primary diodes connect the input lines with certain of their respective output lines, and certain input lines are connected via diodes to auxiliary work line $\alpha$.

Output lines *g* and *j* which receive current from only one single input line 1 and 5 respectively, are connected, according to a particular feature of the invention, directly without diodes to these input lines at direct connecting points $\gamma$ and $\delta$ respectively.

For the reasons set forth above, output line *c* is also diode-free and connected directly via line X to the current source U. P.

Several output lines conduct current only to their respective printing units. Such output lines shall be called "straight" output lines. They are connected via diodes to a plurality of input lines. In Fig. 4, output lines *k*, *n*, *p*, and *z'* are "straight" output lines. Line *k*, for instance, may receive current from input line 1 or 5 via the respective diode means G. Line *n* may receive current from either input line 6, 8 or 9 via one of diodes H, etc.

Several other output lines conduct current not only to their respective printing unit, but concurrently to a second or third printing unit via transverse connecting lines. Such output lines shall be called "branched output" lines and comprise a primary and a secondary output line and printing unit, the former being actuated via a diode-connected output line from an input line, the latter being actuated via a transverse connecting line or branch line from the primary output line.

A typical "branched output" line is, in Fig. 4, the output line *a*, comprising primary diodes A and branching via transverse connecting line Y to secondary output line *d*. The latter line is not connected directly or via diodes to any other input line. Other branched output lines are line *b*, branching via transverse line V to secondary line *e*, and line *h* as a primary line branching via transverse line W to secondary output line *l*, and via transverse line B' to line *b*. The nature of this output line *b* shall be described in more detail below. Further primary "branched output" lines are line *m*, having transverse lines F' and F'', line *s*, having transverse line Z, line *x* having transverse lines P', P'' and P''' and line *y* having transverse line R'.

Finally, there are several output lines which serve for a plural purpose. They may receive current via primary diodes from input lines and thus serve as "straight" output lines for actuating their respective printing units. Or they may receive current from a primary output line via a transverse connecting line and thus serve as secondary output lines. In order to avoid that current fed through their diodes into these "plural" output lines influences the primary output lines to which they are connected via a transverse connecting line, the latter is provided with a diode which shall be called "secondary diode" to distinguish the same from a primary diode connecting an input line with an output line. As shown in Fig. 4, it is the transverse connecting lines B', F', F'', J', J'', N', P', P'', P''' and R' which are thus provided with secondary diodes.

Such "plural" output lines in Fig. 4 are the lines *b*, *f*, *i*, *o*, *q*, *r*, *t*, *u*, *z* and *y'*. In the light of the above explanations, output line *f* may act as a secondary line to primary branched output line *s*, receiving current from input line 1 or 4, as the case may be via one of primary diodes N, primary line *s*, and transverse line N' containing a secondary diode. Thereby the printing unit of output lines *s* and *f* will respond simultaneously. On the other hand, "plural" output line *f* may also act as a straight output line when receiving current from input line 6 via primary diode D. In this case, the secondary diode in transverse line N' prevents current from flowing into output line *s* whose printing unit remains inoperative while only the printing unit of line *f* responds.

The reduction in the number of diodes required due to the replacement of a portion thereof by transverse connecting lines according to the invention becomes particularly obvious, when considering the functions of output line *b* in connection with those of primary output line *h* and secondary output line *e*. Line *b* is hooked up via primary diode C to input line 5. Line *h* is hooked up via primary diodes B to input lines 0, 2, 3, 7, 8 and 9.

Since input line 5 must supply current simultaneously to the printing units of lines *b* and *e*, its hookup to these output lines would conventionally require two diodes, while the hookup of input lines 0, 2, 3, 7, 8 and 9 each to the three output lines *h*, *b* and *e* would normally require $3\times6=18$ diodes, or a total of 20 diodes for input lines 0, 2, 3, 7, 8, 9 plus line 5 to these three output lines *b*, *e* and *h*.

Now, according to the invention, output line *e* is used as a secondary and hooked up to output line *b* via transverse line V and to line *h* via transverse line B' containing a secondary diode. All three printing units of output lines *h*, *b* and *e* can now be activated by current flowing from one of the input lines 0, 2, 3, 7, 8 or 9 via a primary diode B, and transverse lines B' and V. On the other hand, current from input line 5 can reach the printing units of output lines *b* and *e* via primary diode C and via transverse line V, but cannot activate the printing unit of output line *h* due to the presence of the secondary diode in transverse line B'. The total number of diodes required in the hookup according to the invention, thus amounts in this particular case to only eight instead of the normally required twenty. This is a reduction in the number of diodes of over 50%.

A further reduction in the total number of diodes required in the control network is achieved by the use of auxiliary output line $\alpha$. The printing units of output lines *o* and *u* are to respond in common to signals received from one of input lines 2, 3, 6, 7 or 8, but separately output line *o* exclusively to signals received from input lines 1, 4 or 9, and output line *u* only to signals from input lines 0 or 5. In a conventional network 15 diodes would be required, while thanks to the use of auxiliary line $\alpha$ and transverse lines J' and J'' having secondary diodes therein, only a total of 12 diodes must be provided.

The control network illustrated in Figure 4 functions in the following manner: If numeral character "1" is to be printed, the printing units of output lines *c*, *f*, *g*, *i*, *k*, *o*, *s*, *w*, *z*, *y'* and *z'* must be activated simultaneously from input line 1. As soon as switch $S_1$ and simultaneously switch $S_x$ are closed, output line *g* receives its current from this input line via the direct connecting point $\gamma$, line *i* via primary diode E, line *k* via diode G, line *o* via diode I, lines *s* and *w* simultaneously via diode N and the latter line further via transverse line Z, line *z* via diode S, line *y'* via diode T, and line *z'* via diode U. Furthermore, output line *f* receives its current from output line *s*, and transverse line N', the secondary diode in the latter line permitting current flow in the direction from *s* to *f* only. Finally, line *c* is activated directly via line X as switch $S_x$ closes concurrently with switch $S_1$.

As can be easily seen from Figures 2 and 3, the composite character "1" is thus completely printed.

In a similar manner, numeral character "6" is printed by closing switch $S_6$ and concurrently switch $S_x$. Output line *f* is activated from input line 6 via diode D, *m* via F, *n* via H, and *x* via P. Furthermore, line *i* receives its signal via diode-containing transverse line F'', line 9 via diode-containing transverse line F', line *t* via diode-containing transverse line P''', line *y'* via diode-containing transverse line P'', line *z* via diode-containing transverse line P', line *o* via diode-containing transverse line J'', and line *u* via diode-containing transverse line J'. Finally, line *c* receives its signal via by-pass line X.

Figure 5:
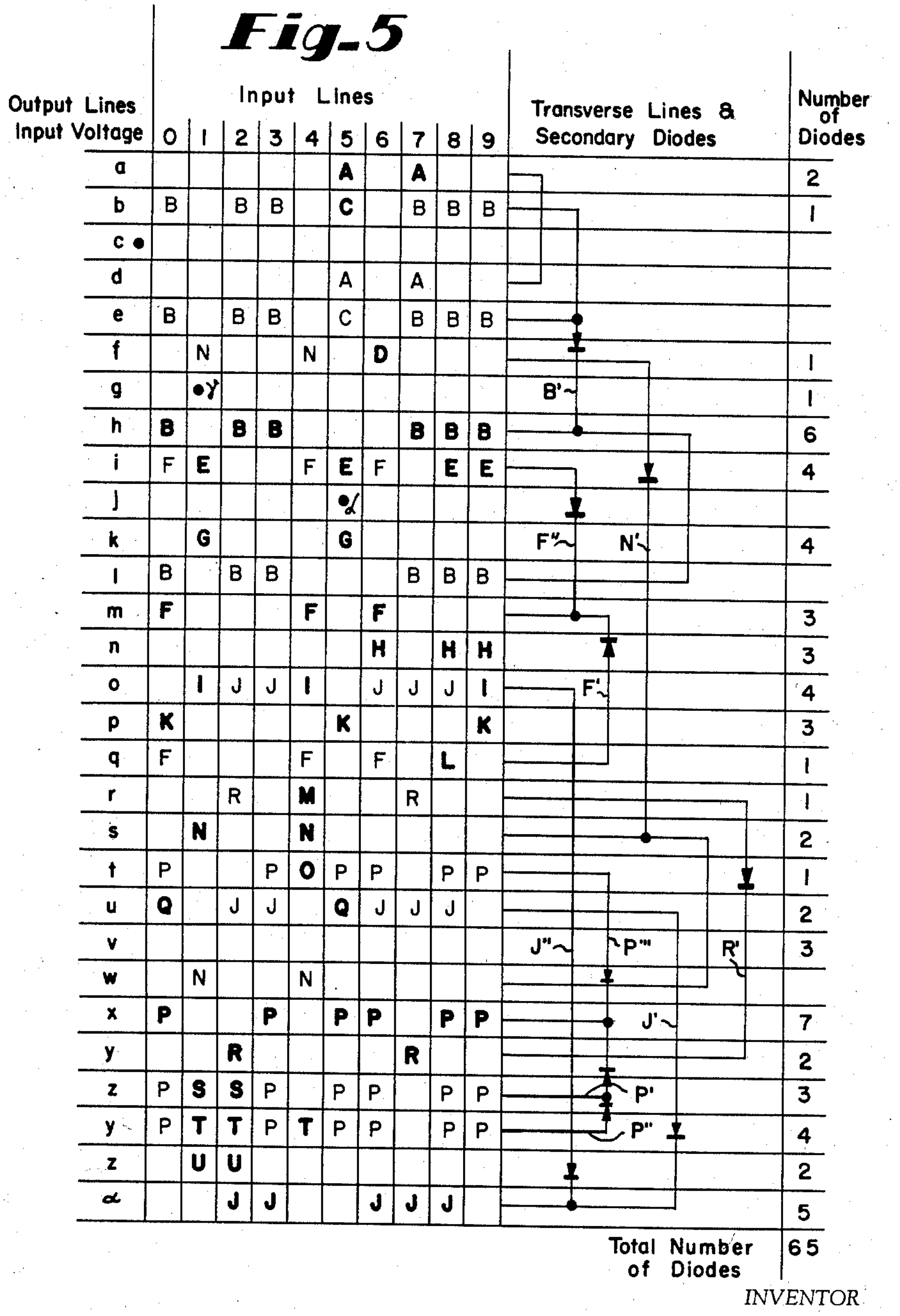
Fig. 5 is a table showing the distribution of diodes in the arrangement illustrated in Fig. 4.

All the remaining numerals of the decade can be printed in a similar manner. The input, output and transverse connecting lines and the primary and secondary diodes participating in the printing of the numeral characters are tabulated in Fig. 5. In this figure, the capital letters shown in fat print in a vertical column indicate the primary diodes directly connecting that particular input line with an output line. The capital letters in thin print indicate that an output line is activated from the same diode characterized by that letter, but via a transverse bypass line or transverse diode-containing line indicated in the column for secondary diodes. Finally, direct diode-free connections between an input line and an output line are characterized by Greek letters $\gamma$ and $\delta$.

It can easily be seen from this tabulation that the total number of 123 diodes normally required in a conventional control network, is reduced in the network according to the invention to 65, or, if parallel printing apparatus of 20 parallel decades is used, this reduction of diodes is from 2460 to only 1300.

Figure 7:
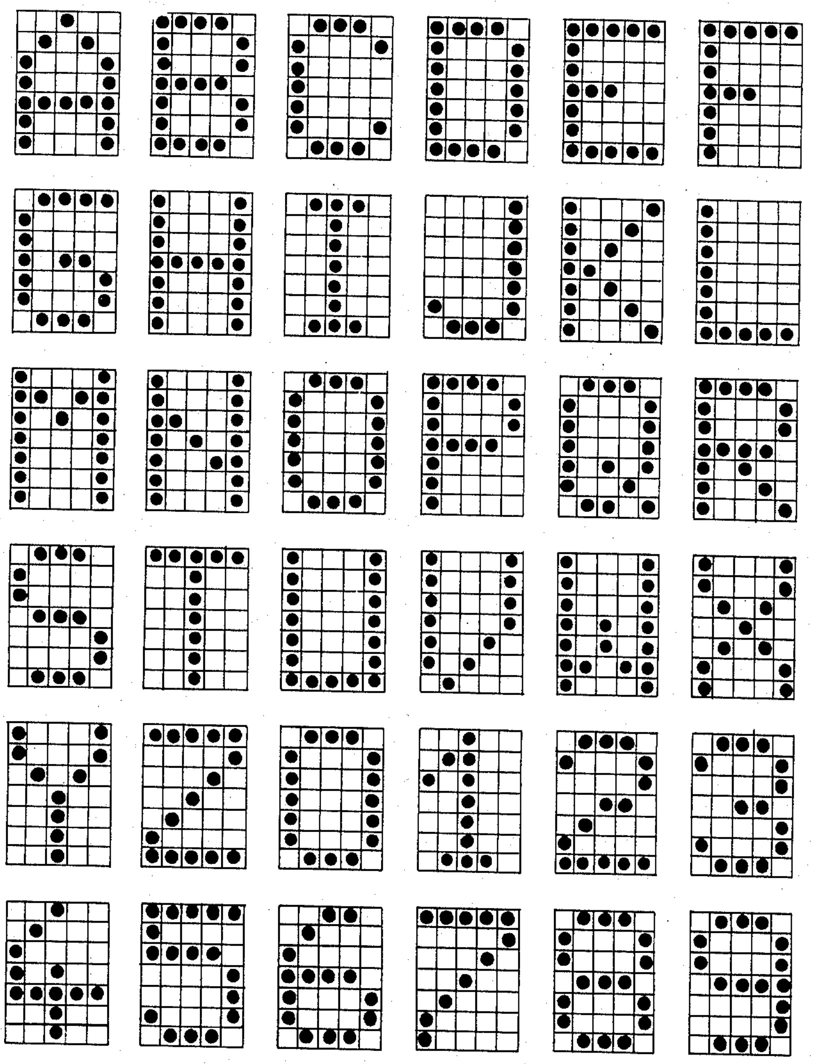
Fig. 7 illustrates which of the elements of the stencil shown in Fig. 6 can be selected to print the letters A to Z and figures 0 to 9.
Figure 6:
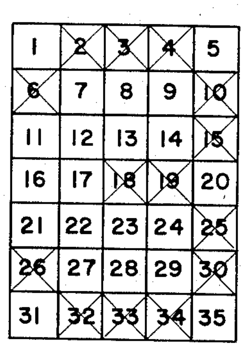
Fig. 6 shows another example of a stencil of the type shown in Fig. 2, but having 35 printing elements 1 to 35.
Figure 8:
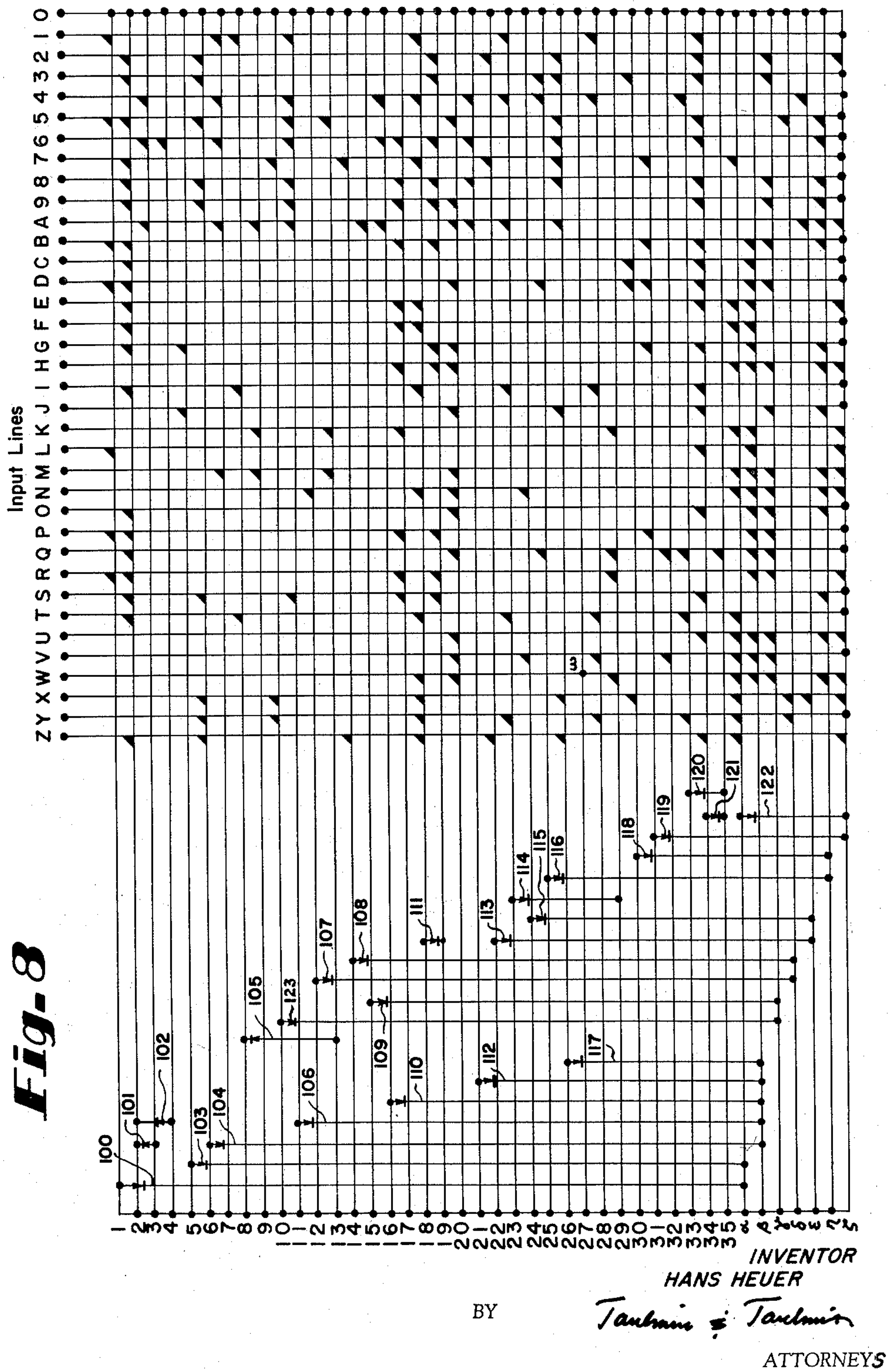
Fig. 8 shows schematically the embodiment of the electric control arrangement according to the invention which is adapted for use with a printing stencil as used in Fig. 6.

Another embodiment of the control arrangement according to the invention is illustrated in Figures 6, 7 and 8.

Fig. 6 shows a five-by-seven stencil subdivided into 35 elements.

Fig. 7 shows how the capital letters A to Z and the numeral characters 0 to 9 can be composed from the various elements of the stencil.

Maximally, in a conventional control network, 572 diodes would be required with this system.

The use of transverse connecting lines 100 to 123 and auxiliary lines $\alpha$ to $\vartheta$ in the control network illustrated in Fig. 8 permits to reduce this high number of diodes to only 30%, which corresponds to a reduction of more than 40%.

In Fig. 8 the primary diodes connecting certain input lines 0 to 9 and A to Z with certain output lines 1 to 35 and auxiliary lines $\alpha$ to $\vartheta$ are represented in a simplified manner as triangles, while the secondary diodes in transverse lines 100 to 123 are represented in the conventional manner.

Of the output lines in Fig. 8, line 27 is a diode-free output line directly connected at point *w* to input line W; output lines 7, 9, 17, 20 and 28 are straight output lines serving only one single printing unit respectively; output lines 2, 8, 19, 29 and 34 are primary "branched output" lines. The remaining output lines 1 through 35 are plural output lines inasmuch as each of them can be activated either by itself, separately, from an input line via a primary diode, or from another primary input line via a transverse line and secondary diode therein simultaneously with that primary input line, which is activated via its proper primary diode from a different input line.

Of course, the electrical control arrangement according to my invention may be laid out in an equivalent manner for any other type of rectangular, circular or other stencil adapted for composing from its stencil fields by suitable selection, letters, numerals, interpunctuation symbols or any other type of characters, in each of which cases the number of diodes that would be normally required can be considerably reduced by replacing a portion of these conventional diodes by transverse connecting lines, direct connecting points and the other means proposed hereinbefore.

This control arrangement is equally applicable to such printing apparatus where the printing surface contains chemical substances or preparations which are made visible by a corresponding change of color contrasting with that of the surface, wherever the contact head of a printing unit is caused, electrically by conventional means, to exude a chemical substance capable of reacting with the preparation in the printing surface so as to produce the aforesaid color change.

It will be understood that this invention is susceptible to modification in order to adapt it to different usages and conditions and, accordingly, it is desired to comprehend such modifications within this invention as may fall within the scope of the appended claims.

What I claim is:

1. In printing apparatus of computing machines and the like, which apparatus produce printed characters on a printing surface by composition, in a combination selectable at will, of character parts printable by means of a number of printing elements arranged closely to each other in the apparatus, an electric control arrangement comprising in combination, a plurality of load lines, a plurality of work lines corresponding to the number of printing elements, a plurality of diode means connecting each of said load lines with a selected number of said work lines, specific for each individual load line, and a plurality of transverse line means each of which connects a determined work line connected via one of said diode means to a load line with at least one other work line.

2. In printing apparatus of computing machines and the like, which apparatus produce printed characters on a printing surface by composition, in a combination selectable at will, of character parts printable by means of a number of printing elements arranged closely to each other in the apparatus, an electric control arrangement comprising in combination, a plurality of load lines, a plurality of work lines corresponding to at least the number of printing elements, a plurality of diode means connecting each of said load lines with a selected number of said work lines, specific for each individual load line, at least one first type transverse line connecting a determined work line connected via one of said diode means to a load line with at least one other work line which is unconnected to a load line, and at least one second type transverse line connecting a determined work line connected via one of said diode means to a load line with at least one other work line connected via diode means to a different load line.

3. In printing apparatus of computing machines and the like, which apparatus produce printed characters on a printing surface by composition, in a combination selectable at will, of character parts printable by means of a number of printing elements arranged closely to each other in the apparatus, an electric control arrangement comprising in combination, a plurality of load lines, a plurality of work lines corresponding to the number of printing elements, a plurality of diode means connecting each of said load lines with a selected number of said work lines, specific for each individual load line, at least one first type transverse line connecting a determined work line connected via a first said diode means to a load line with at least one other work line which is unconnected to a load line, at least one second type transverse line connecting a determined work line connected via a second diode means to a load line with at least one other work line connected via diode means to a different load line, and third diode means in said second type connecting line, both said second and third diode means being adapted to permit the passage of electric current in the same direction.

4. In printing apparatus of computing machines and the like, which apparatus produce printed characters on a printing surface by composition, in a combination selectable at will, of character parts printable by means of a number of printing elements arranged closely to each other in the apparatus, an electric control arrangement comprising in combination, a plurality of load lines, a plurality of work lines corresponding to the number of printing elements, a plurality of diode means connecting each of said load lines with a selected number of said work lines, specific for each individual load line, at least one first type transverse line connecting a determined work line connected via one of said diode means to a load line with at least one other work line which is unconnected to a load line, at least one second type transverse line connecting a determined work line connected via one of said diode means to a load line with at least one other work line connected via diode means to a different load line, a printing surface, a source of direct electric current, a pole of said source connected to said printing surface, another pole of said source connected to said load lines, and a direct connecting line from said other pole to those of said work lines which correspond to the printing elements capable of printing character parts common to all characters to be printed.

5. In printing apparatus of computing machines and the like, which apparatus produce printed characters on a printing surface by composition, in a combination selectable at will, of character parts printable by means of a number of printing elements arranged closely to each other in the apparatus, an electric control arrangement comprising in combination, a plurality of load lines, a plurality of work lines corresponding to the number of printing elements, a plurality of diode means connecting each of said load lines with a selected number of said work lines, specific for each individual load line, at least one first type transverse line connecting a determined work line connected via one of said diode means to a load line with at least one other work line which is unconnected to a load line, at least one second type transverse line connecting a determined work line connected via one of said diode means to a load line with at least one other work line connected via diode means to a load line, and diode-free connections between a determined load line and a work line corresponding to a character part pertaining exclusively to one single character to be printed.

6. An electric printing apparatus control system for use with computing and the like machines comprising a printing surface, a plurality of printing elements closely arranged next adjacent each other and adapted each for printing a part of a character pertaining to a group of characters, means for selectively energizing a combination of several of said printing elements to print a composite character from said group onto said printing surface, and a network of load lines for feeding electric printing pulses thereto, work lines connected to said printing elements and diode means intermediate certain of said load lines and said work lines, said network being adapted for selectively energizing said printing elements, and further comprising transverse lines intermediate certain of said work lines, diode means in certain of said transverse lines, and directly conductive connections intermediate certain of said work lines and determined load lines, thereby reducing the total number of diode means required in the network.

7. An electric printing apparatus control arrangement for use with computing machines and the like, in which the characters to be printed are produced with the aid of a plurality of printing units which are compactly arranged next adjacent each other and selectable at will, to form a desired combination of several of these units, by means of a diode matrix network having a plurality of input lines whose number corresponds to that of the characters to be printed, a plurality of output lines whose number corresponds to that of the printing units, and primary diode means directly connecting certain of said input lines to certain of said output lines, which network comprises transverse connecting lines between at least two output lines so as to simultaneously operate several such transversely connected output lines from given first input lines, and secondary diode means in certain of said transverse connecting lines leading from those of said transversely connected output lines operable from a given first input line via one of said primary diode means to other transversely connected output lines operable from said given first input line via said secondary diode means and separately therefrom also operable from given second input lines, said last mentioned primary diode means and secondary diode means permitting flow of current therethrough only in one and the same direction from said given first input line to said transversely connected output lines.

8. An electric printing apparatus control arrangement for use with computing machines and the like, in which the characters to be printed are produced with the aid of a plurality of printing units which are compactly arranged next to each other in a stencil and selectable, at will, to form a desired combination of several of these units together composing a character; which arrangement comprises a diode matrix network having a plurality of input lines whose number corresponds to that of the characters to be printed, a plurality of output lines whose total number corresponds to at least that of the printing units in said stencil, primary diode means intermediate certain of said input lines and certain of said output lines, transverse connecting lines intermediate at least two output lines.

9. An electric printing apparatus control arrangement for use with computing machines and the like, in which the characters to be printed are produced with the aid of a plurality of printing units which are compactly arranged next to each other in a stencil and selectable, at will, to form a desired combination of several of these units together composing a character; which arrangement comprises a diode matrix network having a plurality of input lines whose number corresponds to that of the characters to be printed, a plurality of output lines whose total number corresponds to that of the printing units in said stencil, primary diode means intermediate certain of said input lines and certain of said output lines, transverse connecting lines intermediate at least two output lines, and secondary diode means in certain of said transverse connecting lines, said output lines comprising primary transversely connected output lines connected via a first diode means to an input line to be operated therefrom, secondary transversely connected output lines being connected to a primary output line via one of said transverse connecting lines and being operable therefrom, and at least one plural transversely connected output line connected via transverse connecting lines containing one of said secondary diode means to a primary output line and from there via a first one of said primary diode means to a first input line, and via a second of said primary diode means to a second input line, said secondary diode means and first primary diode means being connected so as to permit current flow from said first input line to said plural output line, and preventing influencing of said last mentioned primary output line, when said plural output line is operated separately from said secondary input line.

10. An electric printing apparatus control arrangement for use with computing machines and the like, in which the characters to be printed are produced with the aid of a plurality of printing units which are compactly arranged next to each other in a stencil and selectable, at will, to form a desired combination of several of these units together composing a character; which arrangement comprises a diode matrix network having a plurality of input lines whose number corresponds to that of the characters to be printed, a plurality of output lines whose total number corresponds to that of the printing units in said stencil, primary diode means intermediate certain of said input lines and certain of said output lines, transverse connecting lines intermediate at least two output lines, and secondary diode means in certain of said transverse connecting lines, said output lines comprising diode-free output lines directly connected to an input line, primary transversely connected output lines connected via a first diode means to an input line to be operated therefrom, secondary transversely connected output lines being connected to a primary output line via one of said transverse connecting lines and being operable therefrom, and at least one plural transversely connected output line connected via transverse connecting lines containing one of said secondary diode means to a primary output line and from there via a first one of said primary diode means to a first input line, and via a second of said primary diode means to a second input line, said secondary diode means and first primary diode means being connected so as to permit current flow from said first input line to said plural output line, and preventing influencing of said last mentioned primary output line, when said plural output line is operated separately from said scondary input line.

11. An electric printing apparatus control arrangement for use with computing machines and the like, in which the characters to be printed are produced with the aid of a plurality of printing units which are compactly arranged next to each other in a stencil and selectable, at will, to form a desired combination of several of these units together composing a character; which arrangement comprises a diode matrix network having a plurality of input lines whose number corresponds to that of the characters to be printed, a plurality of output lines whose total number corresponds to that of the printing units in said stencil, primary diode means intermediate certain of said input lines and certain of said output lines, transverse connecting lines intermediate at least two output lines, and secondary diode means in certain of said transverse connecting lines, said output lines comprising diode-free output lines directly connected to an input line, straight output lines connected via a primary diode means to an input line to be operated therefrom and being free from transverse connections, primary transversely connected output lines connected via a first diode means to an input line to be operated therefrom, secondary transversely connected output lines being connected to a primary output line via one of said transverse connecting lines and being operable therefrom, and at least one plural transversely connected output line connected via transverse connecting lines containing one of said secondary diode means to a primary output line and from there via a first one of said primary diode means to a first input line, and via a second of said primary diode means to a second input line, said secondary diode means and first primary diode means being connected so as to permit current flow from said first input line to said plural output line, and preventing influencing of said last mentioned primary output line, when said plural output line is operated separately from said secondary input line.

12. An improved electrical network for the control of printing apparatus in which the characters to be printed are produced with the aid of a plurality of printing units which are compactly arranged next to each other in a stencil and selectable, at will, to form a desired combination of several of these units together composing a character, and adapted to be used with computing machines and the like, which network comprises input and output lines normally connected with each other by diode means, a portion of these diode means normally used being replaced by transverse connecting lines intermediate at least two output lines.

13. An improved electrical network for the control of printing apparatus in which the characters to be printed are produced with the aid of a plurality of printing units which are compactly arranged next to each other in a stencil and selectable, at will, to form a desired combination of several of these units together composing a character, and adapted to be used with computing machines and the like, which network comprises input and output lines normally connected with each other by means of primary diode means, a portion of these diode means normally used being replaced by transverse connecting lines intermediate determined pairs of output lines, directly connecting the latter, and by transverse connecting lines containing secondary diodes, intermediate other determined pairs of output lines.

14. An improved electrical network for the control of printing apparatus in which the characters to be printed are produced with the aid of a plurality of printing units which are compactly arranged next to each other in a stencil and selectable, at will, to form a desired combination of several of these units together composing a character, and adapted to be used with computing machines and the like, which network comprises input and output lines normally connected with each other by means of primary diode means, a portion of these diode means normally used being replaced by transverse connecting lines intermediate determined pairs of output lines, directly connecting the latter, by transverse connecting lines containing secondary diodes, intermediate other determined pairs of output lines, and by direct connections between certain input and output lines free from diodes.

No references cited.